United States Patent
Krueger

(10) Patent No.: US 10,415,852 B2
(45) Date of Patent: Sep. 17, 2019

(54) SEGMENT OF A SOLAR COLLECTOR AND SOLAR COLLECTOR

(75) Inventor: Joachim Krueger, Duckwitz (DE)

(73) Assignee: Johannes Furst Zu Waldburg-Wolfegg Und Waldsee, Wolfegg (DE)

( * ) Notice: Subject to any disclaimer, the term of this patent is extended or adjusted under 35 U.S.C. 154(b) by 369 days.

(21) Appl. No.: 13/574,009

(22) PCT Filed: Jan. 27, 2011

(86) PCT No.: PCT/EP2011/051147
§ 371 (c)(1),
(2), (4) Date: Jul. 19, 2012

(87) PCT Pub. No.: WO2011/092246
PCT Pub. Date: Aug. 4, 2011

(65) Prior Publication Data
US 2012/0293881 A1 Nov. 22, 2012

(30) Foreign Application Priority Data
Feb. 1, 2010 (DE) .................. 10 2010 006 532

(51) Int. Cl.
*G02B 5/10* (2006.01)
*F24S 30/425* (2018.01)
(Continued)

(52) U.S. Cl.
CPC ............. *F24S 30/425* (2018.05); *F24S 23/74* (2018.05); *F24S 25/30* (2018.05); *G02B 5/10* (2013.01);
(Continued)

(58) Field of Classification Search
CPC ........... G02B 7/183; G02B 5/10; Y02E 10/45; Y02E 10/47; F24S 23/74; F24S 25/30; F24S 30/425
(Continued)

(56) References Cited

U.S. PATENT DOCUMENTS 1,814,897 A * 7/1931 Coxe .......................... F24J 2/14
126/646
4,115,177 A * 9/1978 Nelson .......................... 156/245
(Continued)

FOREIGN PATENT DOCUMENTS

DE 19744767 A1 4/1999
DE 602 08 680 T2 9/2006
(Continued)

OTHER PUBLICATIONS

International Search Report, along with English translation thereof, dated Nov. 17, 2012 from corresponding International Patent Application No. PCT/EP2011/051147—6 pages.

*Primary Examiner* — Ricky D Shafer
(74) *Attorney, Agent, or Firm* — The Webb Law Firm

(57) ABSTRACT

The invention relates to a segment of a solar collector extending in a longitudinal direction, said segment being provided with a plate arrangement having a two-dimensional upper side on which a reflective layer is arranged. A plurality of rib elements are arranged on a lower side of the plate arrangement, each rib element extending transversely to the longitudinal direction of the solar collector. At least one rigidifying element, preferably at least one brace element, extends in the longitudinal direction of the solar collector, connecting the rib elements.

21 Claims, 3 Drawing Sheets

Figure 5:
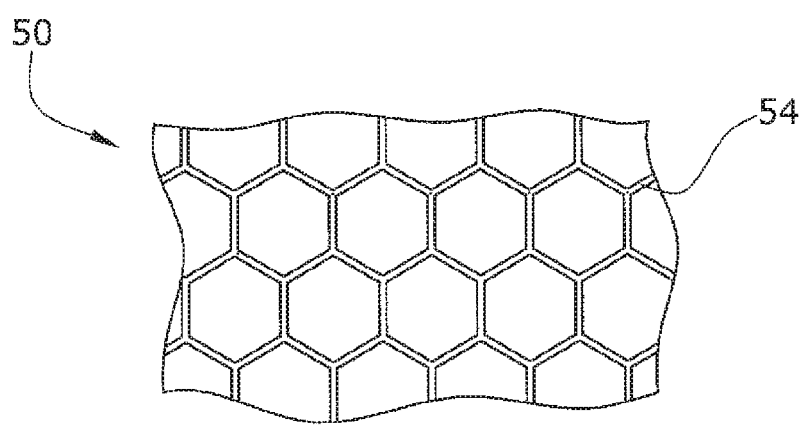

(51) Int. Cl.
*F24S 25/30* (2018.01)
*F24S 23/74* (2018.01)
*F24S 23/70* (2018.01)

(52) U.S. Cl.
CPC ......... *F24S 2023/874* (2018.05); *Y02E 10/45* (2013.01); *Y02E 10/47* (2013.01)

(58) Field of Classification Search
USPC ......... 359/853, 685, 696; 126/685, 696, 694
See application file for complete search history.

(56) References Cited

U.S. PATENT DOCUMENTS

| | | | | |
|---|---|---|---|---|
| 4,135,493 | A * | 1/1979 | Kennedy | 126/577 |
| 4,240,406 | A * | 12/1980 | Hutchison | 359/867 |
| 4,297,003 | A * | 10/1981 | Hutchison | 359/852 |
| 4,372,027 | A * | 2/1983 | Hutchison | 29/448 |
| 4,390,241 | A * | 6/1983 | Trihey | F24J 2/145 |
| | | | | 126/694 |
| 4,422,614 | A * | 12/1983 | Santos | 248/475.1 |
| 4,423,719 | A | 1/1984 | Hutchison | |
| 4,432,343 | A | 2/1984 | Riise et al. | |
| 4,515,148 | A * | 5/1985 | Boy-Marcotte | F24J 2/145 |
| | | | | 126/570 |
| 4,528,977 | A * | 7/1985 | Malley | 126/600 |
| 4,559,926 | A * | 12/1985 | Butler | 126/578 |
| 5,964,216 | A * | 10/1999 | Hoffschmidt et al. | 126/696 |
| 8,166,966 | B2 * | 5/2012 | Detch | 126/684 |
| 8,627,815 | B2 * | 1/2014 | Vazquez Ingelmo et al. | |
| | | | | 126/690 |
| 2014/0182580 | A1 * | 7/2014 | Marcotte et al. | 126/696 |

FOREIGN PATENT DOCUMENTS

| | | |
|---|---|---|
| EP | 1947403 A1 | 7/2008 |
| WO | 2008010031 A1 | 1/2008 |

\* cited by examiner

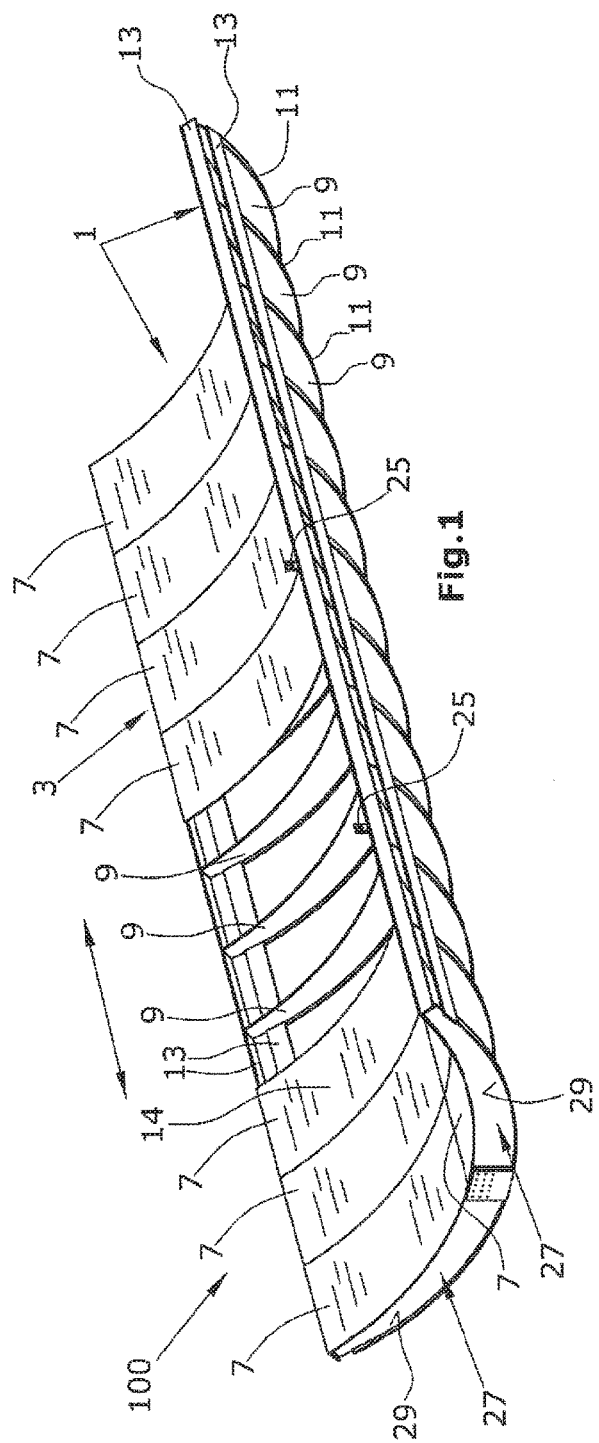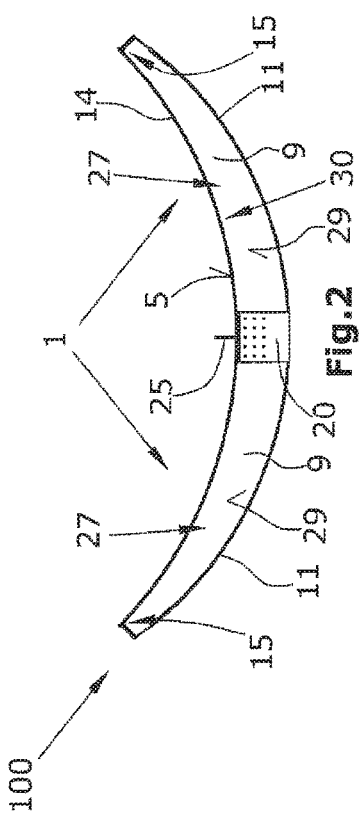

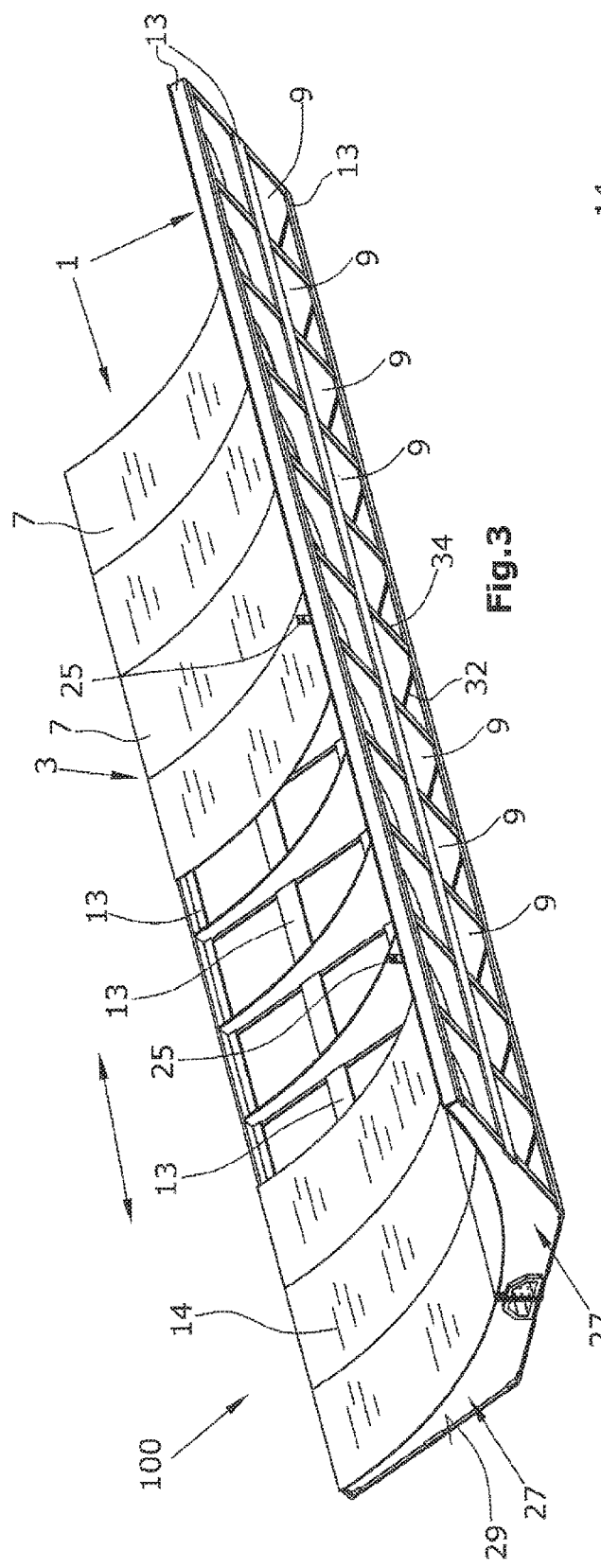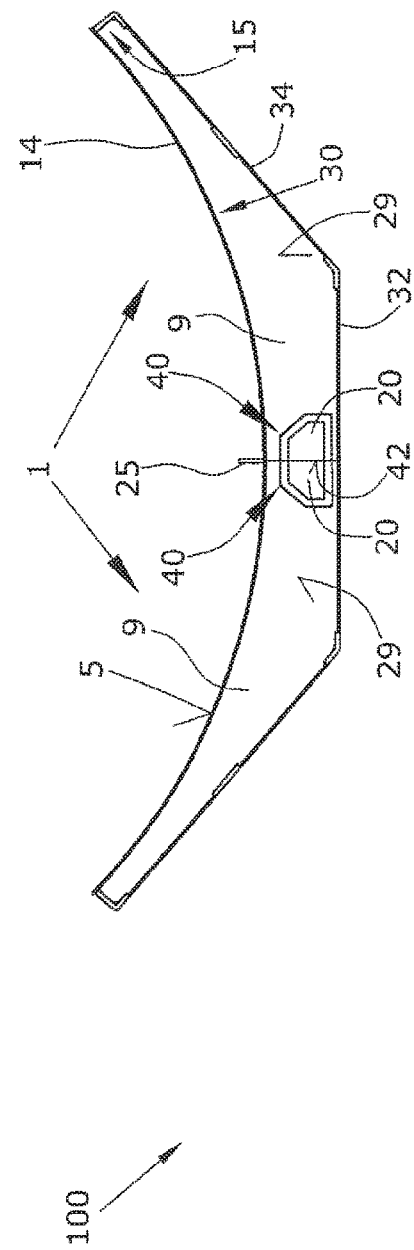

SEGMENT OF A SOLAR COLLECTOR AND SOLAR COLLECTOR

RELATED APPLICATIONS

This is the U.S. national stage application which claims priority under 35 U.S.C. § 371 to International Patent Application No. PCT/EP2011/051147, filed Jan. 27, 2011, which claims priority to German Patent Application No. 10 2010 006532.3, filed Feb. 1, 2010, the disclosures of which are incorporated by reference herein their entireties.

The present invention refers to the structure of solar collectors as well as to the structure of segments of a solar collector.

Solar collectors are often used in the form of parabolic trough concentrators in power plants or in the generation of process heat.

Such large installations may be formed by a plurality of successive solar collectors with trough-shaped reflectors that direct sunlight to a tubular absorber. In order to align the solar collectors to the sunlight, it is known to rotate the trough-shaped reflectors about their longitudinal axis. In the interest of reducing the device-related technical effort, often a plurality of successive reflectors is rotated at the same time by means of one drive.

In this manner, sometimes structures of up to 120 m in length are rotated. For this purpose, the trough-shaped reflectors must have a high torsional stiffness so that only a slight deviation of the rotation angle can occur when the reflectors are rotated.

In the past, solar collectors were often made from steel structures with mirrors set thereon which, however, resulted in a high weight of the solar collectors. Further, complex support structures became necessary and high transportation costs were incurred due to the high weight. Often, the reflectors had to be assembled in situ from individual components, whereby a high assembly effort was caused at the installation location.

On the other hand, solar collectors designed as lightweight constructions often suffer from the drawback of a lacking self-supporting structure so that a great number of struts is required or the solar collectors can be made only rather small in size.

Therefore, it is an object of the present invention to provide a segment of a solar collector that allows realizing a solar collector that is of a lightweight structure, has a high torsional stiffness and a self-supporting structure, while at the same time keeping the assembly effort at the installation location on a low level.

It is another object of the present invention to provide a solar collector of a self supporting lightweight structure.

According to the invention it is provided that a segment of a solar collector extending in a longitudinal direction comprises a plate arrangement with a two-dimensional upper side, a reflective layer being arranged on the upper side.

A plurality of rib elements is arranged on the bottom side of the plate arrangement, each rib element extending transversely to the longitudinal direction of the solar collector. The segment further comprises at least one rigidifying element extending in the longitudinal direction of the solar collector and connecting the rib elements. Preferably, the rigidifying element is at least one brace element.

By providing rib elements arranged on the bottom side of the plate arrangement and extending transversely to the longitudinal direction of the solar collector, it is possible to obtain a self-supporting structure of the segment or of a solar collector built from segments according to the invention, while at the same time realizing a lightweight structure.

It has been found that a solar collector built from the segments of the present invention is very stable, for instance with respect to loads acting thereon from the outside, such as strong winds, for example.

The rigidifying elements extending in the longitudinal direction of the solar collector provide additional stability to the segment and thus to the solar collector and increase the torsional stiffness of the segment.

Because of the present structure of the segments, panels made up of one or a plurality of segments of the present invention, from which panels solar collectors of the present invention are assembled, can be transported as one piece so the assembly effort at the installation location is low.

Preferably, it is provided that a narrow side extending in the longitudinal direction of the solar collector is designed for fastening the element to one or a plurality of other segments. Thus, it is achieved that segments according to the present invention can be connected in an advantageous manner in order to form a solar collector. For instance, a solar collector can be assembled from two panels, each formed by one segment of the present invention.

Here, it may be provided that the narrow side is provided with one or a plurality of recesses for receiving at least a part of a torsionally stiff element extending in the longitudinal direction of the solar collector, the recesses being preferably arranged in the rib elements. In this manner, it becomes possible that the segments can receive one or a plurality of torsionally stiff elements or can be fastened thereto so that a solar collector with very high torsional stiffness can be formed using the segments of the present invention and at least one torsionally stiff element.

It may be provided for the segment of the present invention that a torsionally stiff sectional beam is received in the recesses as the torsionally stiff element and that the torsionally stiff sectional beam forms a connection surface for the connection of the segment with one or a plurality of further segments, with the torsionally stiff sectional beam preferably being configured as an elongate hollow profile.

In other words: the segment of the present invention can be designed such that a torsionally stiff sectional beam is received in the segment and forms a connection surface at the narrow side extending in the longitudinal direction of the solar collector, via which the segment can be connected with other segments.

Providing a torsionally stiff element in the segment or in a solar collector formed from such segments, makes it possible to provide a solar collector of very high torsional stiffness, while at the same time the self-supporting structure is assisted by the torsionally stiff element. In addition, it is possible to fasten a support structure of the solar collector to the torsionally stiff element, whereby a particularly stable mounting of the solar collector formed from the segments of the present invention becomes possible. The torsionally stiff further allows fastening a rotary drive in an advantageous manner to a solar collector made up of the segments of the present invention so that a rotation that is advantageous for the function of the solar collector can be induced into the torsionally stiff element, the torsionally stiff element making it possible for the solar collector formed from the present segments to show only a slight deviation of the rotation angle over the length when it is rotated.

It may be provided that, in a segment according to the present invention, the plate arrangement is formed by a plurality of several plates arranged side by side. Such an element according to the invention has proven particularly favorable with respect to manufacturing.

It may be provided in one embodiment of the invention that the present segment comprises two end faces extending transversely to the longitudinal direction of the solar collector, at least one of the front ends having a connection surface for connecting a segment with an adjacent segment, where the connection surface is preferably formed by one of the rib elements.

Thus, it is possible to advantageously form a solar collector assembled from a plurality of segments according to the invention. It is also possible to connect a solar collector with another solar collector formed by the segments of the invention by the connection surfaces of a segment.

In a particularly preferred embodiment it is provided that the plate arrangement, the rib elements, the at least one rigidifying element and/or the torsionally stiff element are made from plastic material, preferably at least partly from polypropylene, most preferably from a plastic material structure comprising fibers soaked in polypropylene.

With such a choice of material, it is advantageously possible to provide a segment as light in weight as possible so that a solar collector assembled from the segments of the present invention becomes possible that has a very lightweight structure. A plastic material structure with fibers soaked in polypropylene, which may be glass fibers, for instance, is particularly advantageous, since such a plastic material structure is very robust.

The invention advantageously provides that the plate arrangement, the rib elements, the at least one rigidifying element and/or the torsionally stiff element are formed by a sandwich structure having a core structure and at least two layers covering the core structure on opposite sides. Such a structure has proven particularly stable so that a segment and a solar collector formed from segments of the invention can be realized that have great strength.

Here, it is particularly advantageous if the core structure has a honeycomb structure, wherein preferably each honeycomb is open to the cover layers. In a particularly advantageous manner, a honeycomb structure as the core structure allows for a self-supporting structure and a high torsional stiffness of a segment according to the invention and of a solar collector formed from the segments according to the invention.

Due to the honeycomb structure, the segment has a very lightweight structure.

The honeycomb structures may be polygonal or round in cross section.

In one embodiment of the invention it is provided that the distance between the rib elements is adapted to the sizes of the plates of the plate arrangement, such that at least one rib element is arranged under each plate. In this manner, a particularly stable structure of the present segment is achieved, while at the same time the plates of the plate arrangement are supported in a reliable manner.

The plates of the plate arrangement may have a curvature so that, in an advantageous manner, a curved surface and thus a curvature of the reflective layer can be formed.

The invention further provides a solar collector with a plurality of the segments according to the invention. Such a solar collector has a very lightweight structure, a high torsional stiffness and a self-supporting structure.

Here, it may be provided that the solar collector comprises at least two segments of the present invention that are connected at the narrow sides extending in the longitudinal direction of the solar collector. It may also be provided that the at least two segments are connected at the narrow sides extending in the longitudinal direction of the solar collector through a common torsionally stiff element, preferably an elongate sectional beam, extending in the longitudinal direction.

For example, the sectional beam may have a hollow profile. By providing a common torsionally stiff element extending in the longitudinal direction, the at least two segments of the invention can advantageously be connected to form a solar collector of the invention. At the same time, the elongate torsionally stiff element allows for a high torsional stiffness of the solar collector.

Due to the torsionally stiff element extending in the longitudinal direction, it is possible, for example, to induce a rotation into the solar collector, with the solar collector showing only a slight rotation angle deviation over its length, when rotated, because of the torsionally stiff element extending in the longitudinal direction.

In one embodiment of the invention it is provided that a solar collector of the invention is formed by two segments of the invention, each having a torsionally stiff element in the recesses, the element having a connection surface for connecting one segment with the other segment.

In another embodiment of the invention it may be provided that, in the solar collector of the invention, a plurality of segments, connected at the end faces extending transversely to the longitudinal direction of the solar collector, comprises a common torsionally stiff element in the recesses which has a connection surface for connecting the segments with one or a plurality of further segments that comprise a second torsionally stiff element with a connection surface.

In other words: the solar collector of the present invention is formed by two panels, each comprising a torsionally stiff element forming a connection surface. Via the connection surfaces of the torsionally stiff elements, the two panels are assembled to form a solar collector. In this context, a panel can consist of one or a series of segments of the invention that are connected by the end faces.

By providing torsionally stiff elements having connection surfaces for connecting the two panels in order to form a solar collector, it is not only made possible in an advantageous manner to connect the panels, and thereby the segments of the invention, but, further, a structure of the solar collector is obtained that has a high torsional stiffness, which is advantageous in particular during the rotation of the solar collector.

Figure 6:
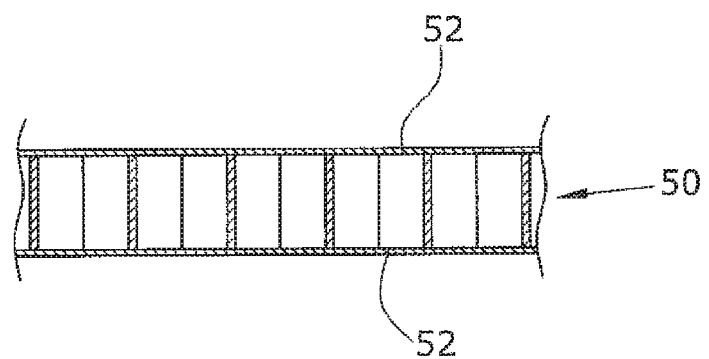

The following is a detailed description of the invention with reference to the accompanying drawings. In the Figures:

FIG. 1 is a schematic perspective view of a first embodiment of a solar collector according to the present invention, FIG. 2 is a schematic side elevational view of the solar collector of the present invention illustrated in FIG. 1, FIG. 3 is a schematic perspective view of a second embodiment of a solar collector according to the present invention, FIG. 4 is a schematic side elevational view of the solar collector of the present invention illustrated in FIG. 3, FIG. 5 is a schematic illustration of the honeycomb structure used in manufacturing the segments and solar collectors of the present invention, and FIG. 6 is a schematic illustration of the sandwich structure used for the segments and solar collectors of the present invention.

FIGS. 1 and 2 illustrate a first embodiment of a solar collector 100 according to the present invention.

The solar collector 100 of the present invention extends in a longitudinal direction (indicated by an arrow in FIG. 1)

and comprises two panels, each panel being formed from a segment 1 of the present invention. The panels are connected by the narrow sides of the segments 1 extending in the longitudinal direction of the solar collector. In the embodiment illustrated in FIGS. 1 and 2, the narrow side is the side of the present segment 1 facing the respective other segment 1 of the present invention.

Each segment 1 of the present invention comprises a plate arrangement 3 having a two-dimensional upper side 5.

A reflective layer 14 is arranged on the upper side 5, by means of which incident sunlight can be reflected by the solar collector to tubular absorbers, for example, which are not illustrated in FIGS. 1 and 2. For that purpose, the plates 7 of the plate arrangement 3 are curved so that the reflective layer 14 also has a curvature.

The segments 1 of the present invention comprise a plurality of rib elements 9 on the bottom side of the plate arrangement 3, which rib elements extend transversely to the longitudinal direction of the solar collector 100. The rib elements 9 have an upper edge 30 adapted to the curvature of the plates 7 of the plate arrangement 3, a lower edge 11 of the rib elements also being curved. This allows for a material-saving design of the rib elements 9 which nevertheless has a reinforcing effect.

The segments 1 of the present invention further comprise rigidifying elements 13 extending in the longitudinal direction of the solar collector 100 and connecting the rib elements 9 with each other.

In the embodiment illustrated in FIG. 1, the rigidifying elements 13 are designed as brace elements. Here, it may be provided that one of the rigidifying elements is arranged at end edges 15 of the rib elements 9, as is seen best in FIG. 2.

Providing the rigidifying elements 13 and the rib elements 9 advantageously allows for a self-supporting structure of the present segment 1 or the present solar collector 100. Here, it has been found that a solar collector 100 of such construction is very stable, in particular with respect to loads acting thereon from the outside, such as strong winds, for example.

The distance between the rib elements 9 is adapted to the plate arrangement 3 such that at least one rib 9 is situated under a respective plate 7 of the plate arrangement 3. Thus, it is possible to support the plates 7 in a particularly advantageous manner.

At the narrow side of the present segments 1, extending in the longitudinal direction of the solar collector, the rib elements 8 are provided with recesses that are not illustrated in FIGS. 1 and 2. The recesses are adapted to a torsionally stiff element 20 extending in the longitudinal direction of the solar collector 100 and receive the torsionally stiff element 20. In this manner, the two panels of the present solar collector 100, each formed by one segment 1 of the invention, are connected in a simple manner by fastening the respective segments 1 at the torsionally stiff element 20. The torsionally stiff element 20 may be a torsionally stiff sectional beam, for example.

The present structure of the segments 1 and of the solar collector 100 advantageously allows for a self-supporting structure, a lightweight construction and a high torsional stiffness of the solar collector of the present invention. A rotational movement can be induced in an advantageous manner into the solar collector 100 via the torsionally stiff element 20 by fastening the solar collector 100 to a support structure with a rotary drive via the torsionally stiff element 20.

The tubular absorbers, not illustrated in FIGS. 1 and 2, can also be fastened to this support structure, the present solar collector 100 possibly being provided with flanges 25 for mounting the tubular absorbers.

The segments 1 of the present invention each have two end faces 27 extending transversely to the longitudinal direction of the solar collector the end faces being adapted to form a first connection surface 29 for connecting a segment of the invention with other segments of the invention. Here, the connection surface 29 may be formed, for example, by one of the rib elements 9.

Using the connection surfaces 29, solar collectors can be built from a plurality of segments 1 of the invention by connecting the segments 1 of the invention via the connection surfaces 29. This may be achieved, for example, by an adhesive connection. It is further possible to connect two or more solar collectors 100 of the invention via the connection surfaces 29 of the segments 1 of the invention.

FIGS. 3 and 4 show a second embodiment of the solar collector 100 of the invention.

The solar collector 100 is formed by two segments 1 of the invention, each comprising a plate arrangement 3 with a two-dimensional upper side 5. The upper side 5 is provided with a reflective layer 14 adapted to direct incident light onto tubular absorbers (not illustrated in FIGS. 3 and 4). The plate arrangement 3 is formed by a plurality of plates 7 arranged side by side which are curved.

A plurality of rib elements 9 is provided on the bottom side of the plate arrangement 3, the rib elements extending transversely to the longitudinal direction of the solar collector 100. In FIG. 3, the longitudinal direction is indicated by an arrow. The rib elements 9 have an upper edge 30 adapted to the curvature of the plates 7 of the plate arrangement 3. Opposite the upper edge, each rib element 9 has a first lower edge 32 and a second lower edge 34 arranged under an obtuse angle with respect to the first lower edge 32. In the initial position of the present segment 1 or of the present solar collector 100, illustrated in FIG. 3, the first lower edge 32 extends horizontally. Since the first lower edge 32 or the second lower edge 34 run straight, the present segments 1 or the present solar collectors 100 formed from the present segments 1 can be deposited, stored or transported in an advantageous manner by placing the segments 1 or the solar collectors 100 on the first lower edges 32 or the second lower edges 34.

The segments 1 of the present invention further comprise rigidifying elements 13 extending in the longitudinal direction of the solar collectors 100 and connecting the rib elements 9 with each other. In the embodiment illustrated in FIG. 3 the present rigidifying elements 13 are configured as brace elements.

Some of the rigidifying elements 13 may be provided with an angle profile so that they extend to the second lower edge 34 via the end edge 15 of the rib element 9 and embrace the edge formed between the end edge 15 and the second lower edge 34. It is further possible that one of the rigidifying elements 13 embraces the edge formed between the first lower edge 32 and the second lower edge 34 of the rib elements 9. By providing the rib elements 9 and the rigidifying elements 13, a particularly high stability of the segments 1 of the present invention or a solar collector 100 of the present invention formed from segments 1 of the present invention becomes possible. Such a solar collector 100 has a lightweight structure, a self-supporting structure as well as a high torsional stiffness. The same is achieved by the rigidifying elements 13, among other reasons. By providing rigidifying elements 13 comprising an angle profile, it is possible to achieve a particularly high torsional stiffness.

To further increase the torsional stiffness of the solar collector 100 of the present invention, the embodiment of a solar collector 100 of the invention illustrated in FIGS. 3 and 4 is provided with two torsionally stiff elements 20 extending in the longitudinal direction of the solar collector 100. One torsionally stiff elements 20 is respectively received in recesses 40 provided in a segment 1 of the invention and forms a connection surface 42 at the narrow side of the present segment 1 extending in the longitudinal direction, by which connection surface a segment 1 of the present invention can be connected with the connection surface 42 of a second segment 1 of the invention. The torsionally stiff elements 20 may be designed as hollow profile beams, for example.

Due to the torsionally stiff elements 20 a solar collector of the present invention is obtained that has a particularly high torsional stiffness. Further, in a particularly advantageous manner, the torsionally stiff elements 20 make it possible to induce a rotation into the solar collector 100 of the invention, by fastening the solar collector 100 to a support structure with a rotary device via the torsionally stiff elements 20.

Due to the high torsional stiffness of the solar collector 100 of the present invention, it becomes possible that only a slight rotation angle deviation occurs when the solar collector is rotated. The torsional stiffness of a solar collector of the present invention is so high that even if a plurality of solar collectors of the invention are connected with each other and are rotated by a common rotary device, only a slight rotation angle deviation occurs between the various solar collectors.

The plate arrangement 3, the rib elements 9, the rigidifying elements 13 and the torsionally stiff element may be made from plastic material. It has been found that polypropylene is particularly well suited for manufacturing the segments 1 of the present invention and the solar collector 100 of the present invention. It may be provided, in particular that the polypropylene is used in a plastic material structure in which fibers, in particular glass fibers, are used that are soaked in polypropylene.

Such a plastic material structure has proven particularly stable when used in segments 1 of the present invention.

In order to further increase the stability of the individual elements of the segment of the present invention, the invention provides in particular to use a sandwich structure for the plate arrangement 3, the rib elements 9, the rigidifying elements 13 and the torsionally stiff element 20, as illustrated in FIG. 6. The sandwich structure is formed by a core structure 50 as well as two cover layers 52 covering the core structure on opposite sides thereof. The core structure 50 comprises a plurality of structural members. For example, the core structure 50 may be a honeycomb structure where a plurality of structural members extend between the two cover layers 52 and form an internal framework between the two cover layers 52 as illustrated in FIGS. 5 and 6.

Here, side walls 54 of the honeycombs may also be formed from a plastic material structure of fibers soaked in polypropylene. The honeycombs have a hexagonal cross section, while it is possible, of course, for the honeycombs to have a different polygonal or round cross section. The sandwich structure having a core structure 50 designed as a honeycomb structure is configured such that the honeycombs are open to the layers 52 covering the core structure.

Such a structure has proven particularly stable when used in the manufacture of the segments 1 of the present invention, while simultaneously allowing for a particularly lightweight structure.

Besides the embodiments of the segments according to the invention and the solar collectors of the present invention, other embodiments of the invention are, of course, also possible. For example, the rigidifying elements do not necessarily have to be configured as brace elements. A rigidifying element may, for instance, also be formed by an elongate plate covering a part or all of the bottom side of the segment.

The solar collectors according to the invention may e.g. have a length of 12 m. The curved surface, on which a reflective layer is applied, may have a radius between 2.50 m and 3.50 m, preferably between 3.20 m and 3.30 m.

The solar collectors according to the invention can be formed by two panels that are each formed either by one segment of the invention or a plurality of sequentially arranged segments of the invention. In the embodiment, in which a plurality of sequentially arranged segments forms a panel, the segments may be joined by means of an adhesive connection.

With the solar collectors of the present invention it is possible to arrange a plurality of solar collectors one behind the other in the longitudinal direction so that these can be made to rotate together by means of a rotary drive.

Here, the high torsional stiffness of the present solar collectors makes it possible that only a slight rotation angle deviation occurs between the successive solar collectors when rotated, whereby, in use, an optimal alignment of the solar collectors of the invention with the incident sunlight is possible.

The invention claimed is:

1. A segment of a solar collector extending in a longitudinal direction, comprising: a plate arrangement having a two-dimensional upper side defined by two transverse edges extending transversely to the longitudinal direction and two longitudinal edges extending in the longitudinal direction, on which upper side a reflective layer is arranged, a plurality of rib elements is arranged on a lower side of the plate arrangement, each rib element extending transversely to the longitudinal direction of the solar collector, and at least one rigidifying element extends in the longitudinal direction of the solar collector, connecting the rib elements,
    wherein at least one side of the segment corresponding to one of the longitudinal edges is provided with one or a plurality of recesses for receiving at least a part of a torsionally stiff element extending in the longitudinal direction of the solar collector, the recesses being arranged in the rib elements, and
    wherein at least one of the plate arrangement, the rib elements, the at least one rigidifying element and the torsionally stiff element are formed from a sandwich structure, the sandwich structure further comprising at least two layers and a plurality of structural members, wherein the plurality of structural members extend between the two layers and form an internal framework between the two layers.

2. The segment of claim 1, wherein the torsionally stiff element is a torsionally stiff sectional beam that forms a connection surface for connecting the segment with one or a plurality of other segments.

3. The segment of claim 2, wherein the torsionally stiff sectional beam has an elongate hollow profile.

4. The segment of claim 1, wherein the plate arrangement is formed by a plurality of plates.

5. The segment of claim 4, wherein a distance between the rib elements is adapted to the size of the plates such that at least one rib element is arranged under each plate.

6. The segment of claim 4, wherein the plates are curved.

7. The segment of claim 1, further comprising two end faces extending transversely to the longitudinal direction of the solar collector, at least one of the end faces having a connection surface for connecting the segment with an adjacent segment.

8. The segment of claim 7, wherein the connection surface is formed by one of the rib elements.

9. The segment of claim 1, wherein the plate arrangement, the rib elements, the at least one rigidifying element and a torsionally stiff element are made from plastic material.

10. The segment of claim 9, wherein the plastic material is at least partly polypropylene.

11. The segment of claim 9, wherein the plastic material is a plastic material structure with fibers soaked in polypropylene.

12. The segment of claim 1, wherein the internal framework has a honeycomb structure comprising a plurality of openings, and each opening is open to the respective layers.

13. The segment of claim 12, wherein each opening has a polygonal cross section.

14. A solar collector comprising a plurality of segments according to claim 1.

15. The solar collector of claim 14, wherein at least two of the plurality of segments are connected by a side of the segment corresponding to one of the longitudinal sides.

16. The solar collector of claim 15, wherein the at least two segments are connected by the torsionally stiff element.

17. The solar collector of claim 16, wherein the torsionally stiff element is an elongate sectional beam.

18. The solar collector of claim 14, wherein the torsionally stiff element comprises at least two torsionally stiff sectional beams, each of the torsionally stiff sectional beams having a connection surface for connecting one segment with the other segment and at least two of the plurality of segments each comprise one of the torsionally stiff sectional beams.

19. The solar collector of claim 14, wherein the plurality of segments are connected by end faces extending transversely to the longitudinal direction of the solar collector and the torsionally stiff element is received in the one or more recesses of the plurality of segments and has a connection surface for connecting the plurality of segments with one or a plurality of further segments having a second torsionally stiff element with a connection surface.

20. The segment of claim 1, wherein the at least one rigidifying element is a brace element.

21. A segment of a solar collector extending in a longitudinal direction, comprising: a plate arrangement having a two-dimensional upper side defined by two transverse edges extending transversely to the longitudinal direction and two longitudinal edges extending in the longitudinal direction, on which upper side a reflective layer is arranged, a plurality of rib elements is arranged on a lower side of the plate arrangement, each rib element extending transversely to the longitudinal direction of the solar collector, and at least one rigidifying element extends in the longitudinal direction of the solar collector, connecting the rib elements,
  wherein the longitudinal edges have a length in the longitudinal direction that is smaller than a length of the transverse edges in a direction transverse to the longitudinal direction and at least one of the plate arrangement, the rib elements, the at least one rigidifying element, and a torsionally stiff element are formed from a sandwich structure, the sandwich structure further comprising at least two layers and a plurality of structural members, wherein the plurality of structural members extend between the two layers and form an internal framework between the two layers.

* * * * *